United States Patent
Grasboeck et al.

(10) Patent No.: US 11,588,401 B2
(45) Date of Patent: Feb. 21, 2023

(54) METHOD FOR OPERATING AN INVERTER AND INVERTER FOR CARRYING OUT THE METHOD

(71) Applicant: Fronius International GmbH, Pettenbach (AT)

(72) Inventors: Richard Grasboeck, Pettenbach (AT); Wolfgang Metzner, Pettenbach (AT); Gerald Ritzberger, Pettenbach (AT); Stefan Wieser, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 17/783,112

(22) PCT Filed: Mar. 23, 2021

(86) PCT No.: PCT/EP2021/057485
§ 371 (c)(1),
(2) Date: Jun. 7, 2022

(87) PCT Pub. No.: WO2021/191232
PCT Pub. Date: Sep. 30, 2021

(65) Prior Publication Data
US 2022/0416655 A1    Dec. 29, 2022

(30) Foreign Application Priority Data
Mar. 24, 2020   (EP) ..................................... 20165328

(51) Int. Cl.
*H02M 3/158* (2006.01)
*H02M 1/08* (2006.01)
(Continued)

(52) U.S. Cl.
CPC ............. *H02M 3/158* (2013.01); *H02M 1/08* (2013.01); *H02M 1/38* (2013.01); *H02M 1/0003* (2021.05); *H02M 3/1584* (2013.01)

(58) Field of Classification Search
None
See application file for complete search history.

(56) References Cited

U.S. PATENT DOCUMENTS 8,453,814 B2 * 6/2013 Gambach ............ H02M 3/1582
  191/3
9,450,512 B2   9/2016 Bremicker et al.
(Continued)

FOREIGN PATENT DOCUMENTS

DE   10 2006 010 694 A1   9/2007
DE   10 2016 220 204 A1   4/2018
(Continued)

OTHER PUBLICATIONS

International Search Report in PCT/EP2021/057485, dated Jun. 17, 2021.
(Continued)

*Primary Examiner* — Matthew V Nguyen
(74) *Attorney, Agent, or Firm* — Collard & Roe, P.C.

(57) ABSTRACT

In a method for operating an inverter for converting DC voltage into AC voltage, having at least one DC/DC step-up converter for converting a DC input voltage applied at the step-up converter DC input into an output voltage higher by a voltage stroke, an intermediate circuit, a DC/AC converter and an AC output for connection to a supply network and/or consumers, a voltage ripple is superimposed on the intermediate circuit voltage and in each step-up converter a switch is switched on/off with a specific switching frequency and a specific duty cycle, for measuring the output voltage of each step-up converter and the intermediate circuit voltage including the voltage ripple. A minimum voltage stroke (Continued)

Figure 1:
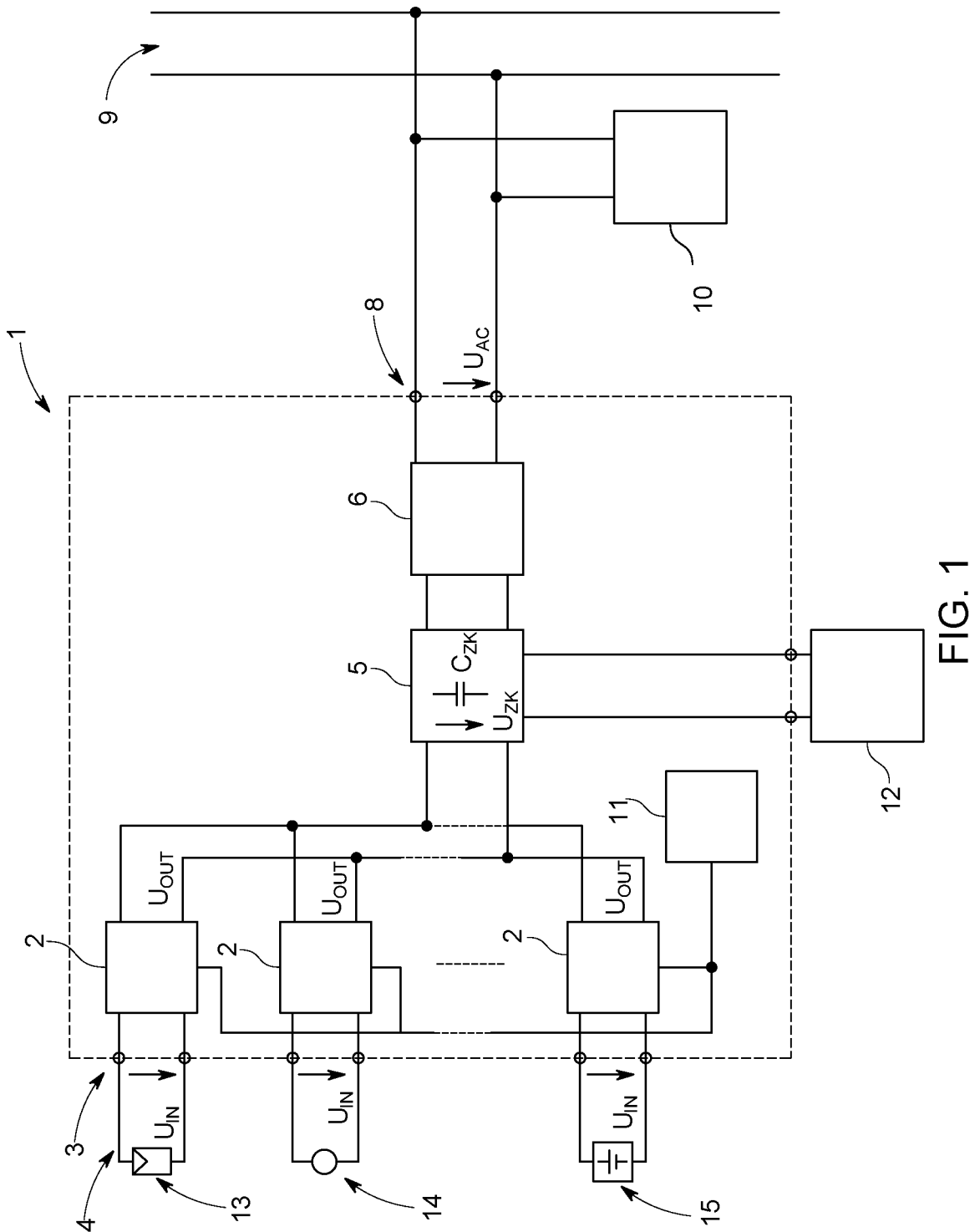

of each step-up converter is dynamically calculated as a function of the respective measured step-up converter input voltage and the measured intermediate circuit voltage ripple, which minimizes the intermediate circuit voltage setpoint.

15 Claims, 4 Drawing Sheets

(51) Int. Cl.
*H02M 1/38* (2007.01)
*H02M 1/00* (2006.01)

(56) References Cited

U.S. PATENT DOCUMENTS

| | | | | |
|---|---|---|---|---|
| 9,531,276 | B2* | 12/2016 | Knoll | ........... B23K 9/1043 |
| 10,116,249 | B2 | 10/2018 | Zou et al. | |
| 10,587,197 | B2 | 3/2020 | Stoeger et al. | |
| 2010/0157632 | A1 | 6/2010 | Batten et al. | |
| 2019/0252992 | A1* | 8/2019 | Schmidt | ........... H02M 3/33576 |
| 2021/0167683 | A1* | 6/2021 | Damec | ........... B60L 13/006 |
| 2021/0211057 | A1* | 7/2021 | Esteghlal | ........... H02M 1/425 |

FOREIGN PATENT DOCUMENTS

| | | |
|---|---|---|
| DE | 10 2018 103 345 A1 | 8/2018 |
| EP | 2 375 552 A1 | 10/2011 |

OTHER PUBLICATIONS

European Search Report in EP 20165328.4-1201, dated Aug. 3, 2020, with English translation of relevant parts.

* cited by examiner

METHOD FOR OPERATING AN INVERTER AND INVERTER FOR CARRYING OUT THE METHOD

CROSS REFERENCE TO RELATED APPLICATIONS

This application is the National Stage of PCT/EP2021/057485 filed on Mar. 23, 2021, which claims priority under 35 U.S.C. § 119 of European Application No. 20165328.4 filed on Mar. 24, 2020, the disclosure of which is incorporated by reference. The international application under PCT article 21(2) was not published in English.

The invention relates to a method for operating an inverter for converting a DC voltage into an AC voltage, having at least one DC/DC converter formed by a step-up converter for converting an input voltage of a DC source applied to the DC input of the step-up converter into an output voltage that is higher by a voltage stroke, an intermediate circuit that has an intermediate circuit capacitor and is supplied with the output voltages of all the step-up converters, a DC/AC converter and an AC output for connection to a supply network and/or consumers, as a result of which a voltage ripple is superimposed on the intermediate circuit voltage at the intermediate circuit capacitor, wherein in each step-up converter with at least one choke, a switch, a diode, and an output capacitor the switch is switched on and off via a control device with a specific switching frequency and a specific duty cycle so that the output voltage of each step-up converter corresponds to a setpoint value of the intermediate circuit voltage between a maximum intermediate circuit voltage and a minimum intermediate circuit voltage, wherein the input voltage of each step-up converter and the intermediate circuit voltage including the voltage ripple are measured.

The invention also relates to an inverter for converting a DC voltage into an AC voltage, having at least one DC/DC converter formed by a step-up converter for converting an input voltage of a DC source applied at the DC input of the step-up converter into an output voltage that is higher by a voltage stroke, an intermediate circuit that has an intermediate circuit capacitor and is supplied with the output voltages of all the step-up converters, a DC/AC converter and an AC output for connection to a supply network and/or to consumers, as a result of which a voltage ripple can be superimposed on the intermediate circuit voltage at the intermediate circuit capacitor, wherein each step-up converter has a choke, a switch, a diode, and an output capacitor, and having a control device that is designed to switch the switch of each step-up converter on and off with a specific switching frequency and a specific duty cycle so that the output voltage of each step-up converter corresponds to a setpoint value of the intermediate circuit voltage between a maximum intermediate circuit voltage and a minimum intermediate circuit voltage, wherein a voltage measuring device for measuring the input voltage of each step-up converter and a voltage measuring device for measuring the intermediate circuit voltage including the voltage ripple are provided.

The invention relates to inverters that are used to convert the DC voltage of various DC voltage sources, such as photovoltaic modules, wind turbines, batteries, etc., into a suitable AC voltage for feeding into a supply network and/or for supplying electrical energy to consumers. Usually, the DC/DC converters arranged in the inverter are formed by so-called step-up converters, buck converters, or boosters, which convert the input voltage of the respective DC source into a higher output voltage, which supplies the intermediate circuit of the inverter. The factor by which the output voltage is higher than the input voltage is called the voltage stroke. In addition to a choke, a diode and an output capacitor, the step-up converter contains a switch that is switched on and off via a control device with a specific switching frequency and duty cycle, so that the input voltage can be converted into an appropriate output voltage according to the desired voltage stroke. Depending on the desired intermediate circuit voltage in the inverter, a fixed voltage stroke is normally used. If the intermediate circuit voltage does not correspond to the desired value, i.e. lies below or above the setpoint, the step-up converter is deactivated. For the intermediate circuit voltage, there is usually a permissible range between a maximum intermediate circuit voltage and a minimum intermediate circuit voltage. If the maximum intermediate circuit voltage is exceeded, the step-up converter is deactivated to protect the intermediate circuit capacitor. If the minimum intermediate circuit voltage is undershot, the step-up converters are also deactivated to prevent a current flow from the supply network into the DC/AC converter.

Usually, the step-up converters of the inverter operate with a fixed voltage stroke. Therefore, if the inverter has a larger input voltage range, the limits of the intermediate circuit voltage are reached relatively quickly and the respective step-up converter must be deactivated, which means that the step-up converter can only be operated in a small operating range. Overall, this does not result in an optimum efficiency level for the inverter.

In addition, by feeding the AC voltage generated by the inverter into the supply network or supplying consumers with electrical energy, an AC voltage component, a so-called voltage ripple, is superimposed on the intermediate circuit voltage at twice the network frequency. The intermediate circuit voltage thus fluctuates according to the amplitude of the voltage ripple at twice the network frequency, as a function of the power fed into the supply network or the consumers. In this way, if the step-up converter has a fixed voltage stroke the limits of the intermediate circuit voltage are reached even more quickly, which results in sub-optimal utilization of the step-up converter and thus a lower efficiency of the inverter.

For example, document EP 2 375 552 A1 describes a method for operating an inverter, wherein the intermediate circuit voltage is set to the lowest possible value for optimizing the efficiency.

A method for operating an inverter and an inverter is also disclosed in US 2010/0157632 A1. In this case the input DC/DC converter is controlled as a function of the measured input voltage of the DC source in order to achieve a constant power flow. The intermediate circuit voltage setpoint corresponds to a fixed reference voltage. To prevent distortion in the AC output signal, the intermediate circuit voltage can be adjusted as required using an additional device.

The object of the present invention is to create a method for operating an inverter and an inverter for carrying out the method, thereby making better use of the input voltage range and allowing further optimization of the efficiency of the inverter. The disadvantages of the prior art are to be avoided or at least reduced.

This object is achieved in terms of the method by a minimum voltage stroke of each step-up converter being dynamically calculated as a function of the measured input voltage of the respective step-up converter and of the measured voltage ripple of the intermediate circuit voltage, and the switch of each step-up converter being switched on and off with the specified switching frequency and the specified duty cycle so that the input voltage is converted according to the calculated voltage stroke into a corresponding output voltage that corresponds to the setpoint of the intermediate circuit voltage, and the setpoint of the intermediate circuit voltage is therefore minimized. By continuously recording the input voltage of each step-up converter and measuring the intermediate circuit voltage including the voltage ripple, the minimum voltage stroke with which the step-up converter increases the input voltage, and thus the output voltage as the setpoint of the intermediate circuit voltage, can be adjusted continuously, i.e. dynamically. This allows better utilization of each step-up converter of the inverter, as by minimizing the voltage stroke and the setpoint of the intermediate circuit voltage the respective step-up converter can be operated with a larger input voltage range. The dynamic calculation of the voltage stroke results in a better efficiency of the inverter. The method is relatively simple and inexpensive to implement.

According to another feature of the invention, the switch of each step-up converter is switched on and off via the control device with the specified switching frequency and duty cycle, taking into account a specified minimum duty cycle. The minimum duty cycle of the step-up converter to be taken into account is defined by the hardware of the step-up converter, in particular the parasitic capacitances of the switch.

Advantageously, the voltage stroke of each step-up converter is dynamically calculated according to the equation $$v = 1/(1-D_{min}) + \Delta U_{ZK}/2 \cdot U_{IN}$$

in which $v$ denotes the voltage stroke, $D_{min}$ the minimum duty cycle of the step-up converter, $\Delta U_{ZK}$ denotes the voltage ripple and $U_{IN}$ the input voltage of the step-up converter. This simple relationship results in an optimum utilization of the step-up converter with little computing effort required for continuously ascertaining the voltage stroke and therefore specifying the setpoint of the intermediate circuit voltage of the inverter.

If the calculated voltage stroke of each step-up converter is increased by a defined value, a controller reserve can be taken into account. The controller reserve can be a specific absolute value of the voltage stroke or a relative value, i.e. a certain percentage of the voltage stroke, for example 2%. By providing such a controller reserve, the controllability of each step-up converter can be guaranteed.

According to another feature of the invention, the input current of each step-up converter is measured and the minimum duty cycle of the switch of each step-up converter is varied as a function of the measured input current. Depending on the size of the input current of the step-up converter, the minimum switching time of the switch is changed due to its parasitic capacitance. At a lower input current, the minimum duty cycle of the step-up converter must be increased, whereas for higher input currents the minimum duty cycle must be reduced. Thus, in certain cases, for example in the morning hours in the case of a photovoltaic module as the DC source with a fairly low input current, the voltage stroke of the step-up converter can be optimally adjusted by adjusting the minimum duty cycle.

Preferably, the input voltage of each step-up converter and the intermediate circuit voltage including the voltage ripple and, if applicable, the current through the choke are measured with a sampling frequency that corresponds to a multiple of the network frequency of the AC voltage and the voltage stroke and, if applicable, the minimum duty cycle are calculated from this. By using a sufficiently high sampling frequency, for example above 1 kHz, an optimal detection of the voltage ripple of the intermediate circuit voltage and thus a quasi-continuous dynamic calculation of the voltage stroke can be achieved.

If each step-up converter is designed to be bi-directional, it can also be used as a step-down converter to convert the output voltage into a lower input voltage. In this case, the inverter can also be used in the reverse direction, for example, to charge batteries connected at its input from the supply network. In this case, also, a dynamic calculation of the inverse voltage stroke takes place with the step-down converters as DC/DC converters.

The object according to the invention is also achieved by an inverter specified above, wherein the control device is designed to dynamically calculate a minimum voltage stroke of each step-up converter as a function of the measured input voltage of the respective step-up converter and of the measured voltage ripple of the intermediate circuit voltage and the control device is designed to switch the switch of each step-up converter on and off with the specified switching frequency and the specified duty cycle so that the input voltage can be converted according to the calculated voltage stroke into a corresponding output voltage that corresponds to the setpoint of the intermediate circuit voltage, and therefore to minimize the setpoint of the intermediate circuit voltage. For details of the advantages achievable as a result, reference is made to the above description of the method for operating the inverter. Since the equipment required for measuring the input voltage and the intermediate circuit voltage, including the voltage ripple, is usually present in an inverter anyway, the hardware complexity required for the realization of the invention is kept within reasonable limits. The processing of the measured values and the calculation of the voltage stroke and control of the step-up converters of the inverter are usually performed in the control system of the inverter by software. If necessary, the computing power of the control device will need to be increased accordingly in order to enable the processing of the measured values at the desired speed and resolution.

According to another feature, the control device is designed to switch the switch of each step-up converter on and off with the specified switching frequency and duty cycle, taking into account a specified minimum duty cycle. As already mentioned above, the minimum duty cycle of the step-up converter is determined by the hardware of the step-up converter, in particular the parasitic capacitances of the switch.

The control device is preferably designed to dynamically calculate the voltage stroke of each step-up converter according to the equation $$v = 1/(1-D_{min}) + \Delta U_{ZK}/2 \cdot U_{IN}.$$

As already described above, this represents an easily implemented calculation of the minimum voltage stroke and thus the minimum setpoint of the intermediate circuit voltage of the inverter.

If the control device is designed to increase the calculated voltage stroke of each step-up converter by a defined value, a controller reserve can be taken into account and the controllability of the step-up converter can be guaranteed.

According to a further feature of the invention, a current measuring device is provided for measuring the input current of each step-up converter and the control device is designed to vary the minimum duty cycle of the switch of each step-up converter as a function of the measured input current. As already mentioned above, this makes it possible to adjust the minimum duty cycle of the step-up converter and to make even better use of the input voltage range of the step-up converter, thereby increasing the efficiency.

The voltage measuring device is preferably designed to measure the input voltage of each step-up converter, the voltage measuring device is designed to measure the intermediate circuit voltage including the voltage ripple and, if applicable, the current measuring device is designed to measure the input current of each step-up converter for recording measured values with a sampling frequency which corresponds to a multiple of the network frequency of the AC voltage, and from this to calculate the voltage stroke and, if applicable, the minimum duty cycle.

The DC source can be formed, for example, by a photovoltaic module, a wind turbine, and/or a battery. Different DC sources can also be connected to one step-up converter or to separate step-up converters.

If each step-up converter is designed to be bi-directional, it can also be used in the reverse direction to convert the DC voltage on the intermediate circuit down to a lower voltage at the DC input. As already mentioned above, the inverter can also be used in the opposite direction in order to charge batteries at its input from the supply network, for example, wherein here also a dynamic calculation of the inverse voltage stroke in the downward converters takes place.

Figure 2:
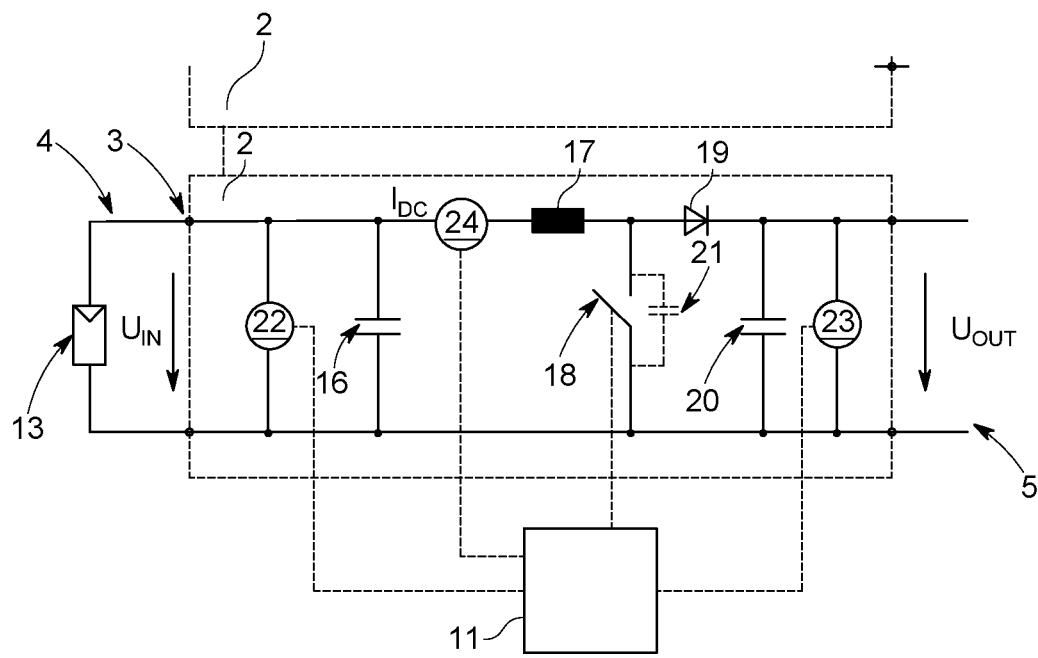
Figure 3:
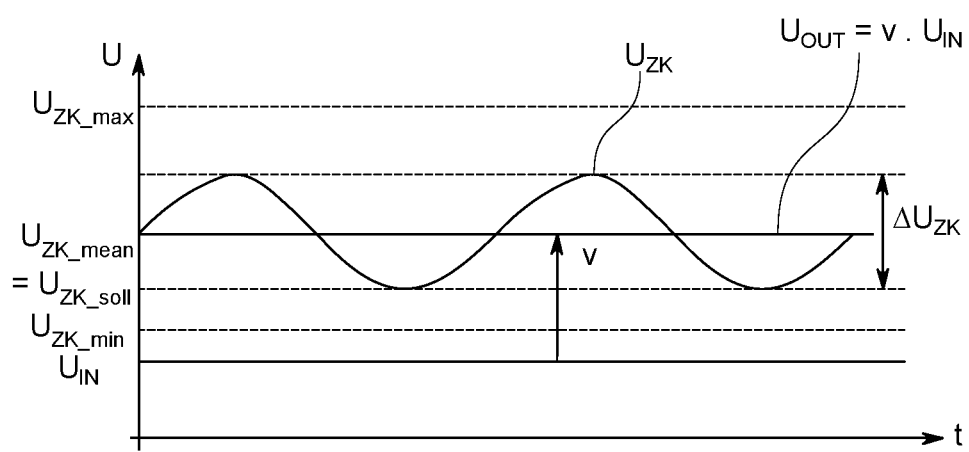
Figure 4:
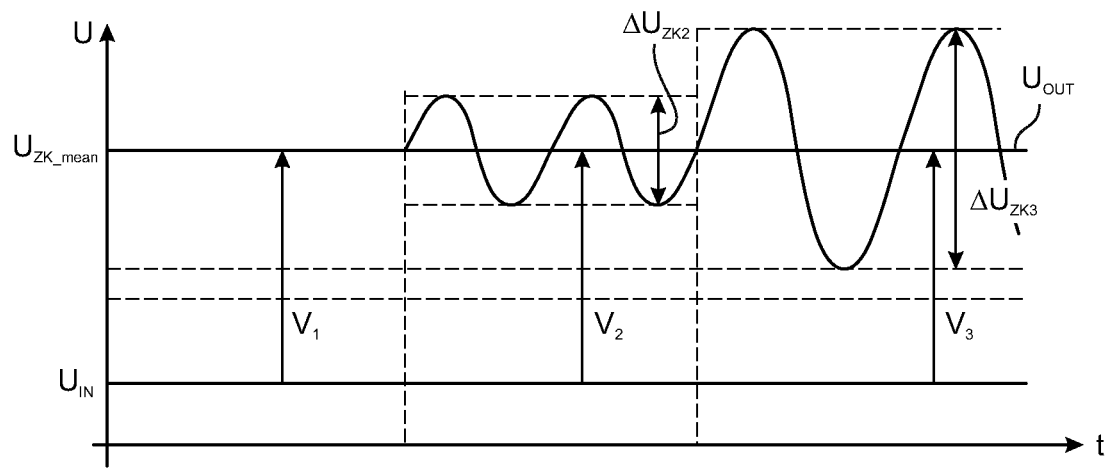
Figure 5:
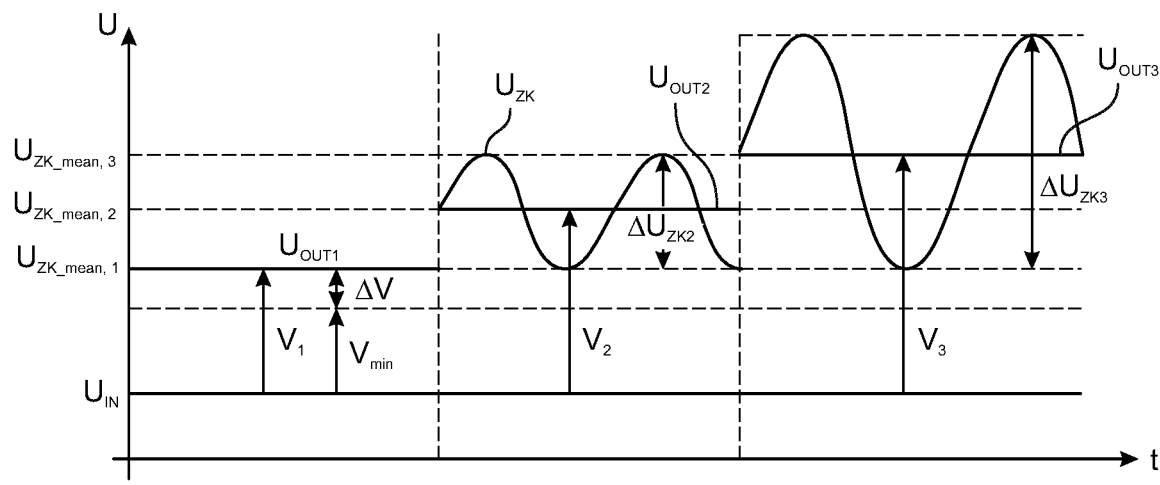
Figure 6:
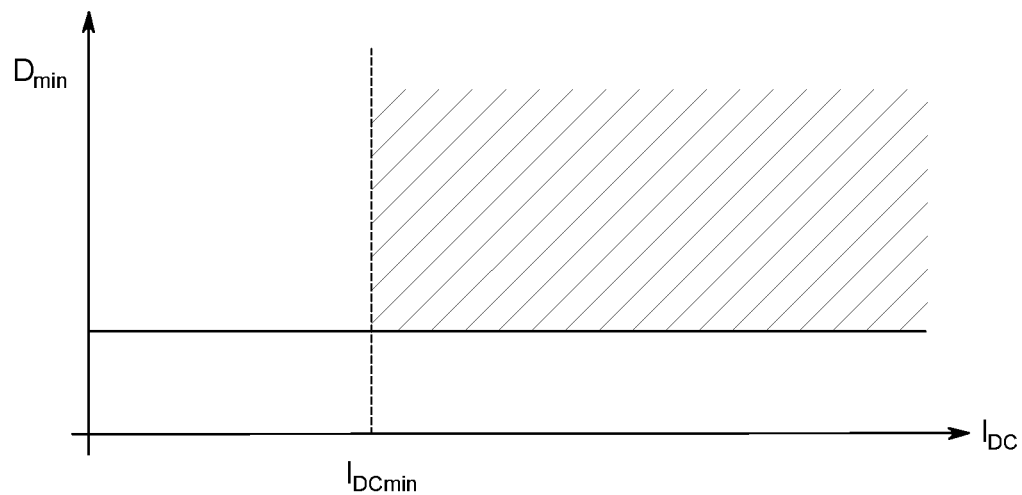
Figure 7:
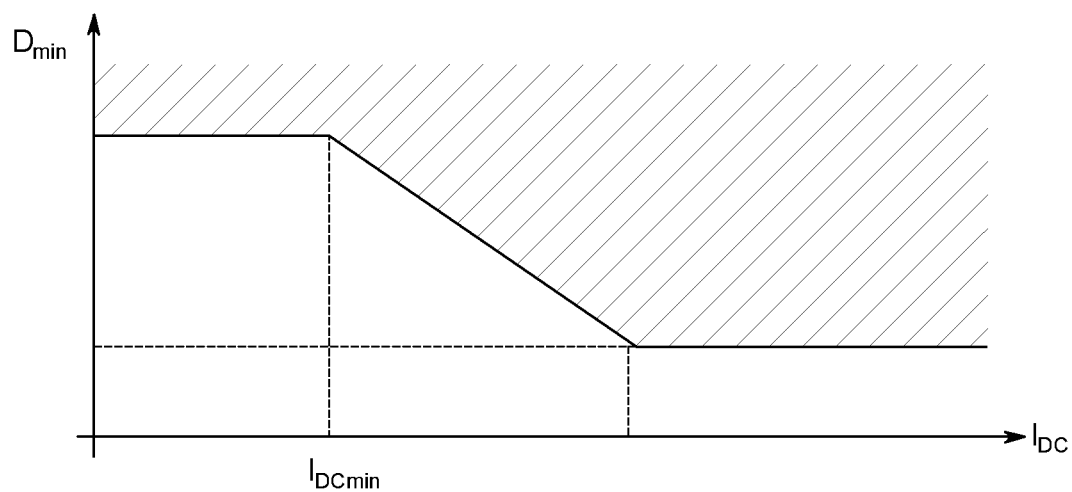

The invention will be explained in further detail by reference to the attached drawings. Shown are:

FIG. 1 a block circuit diagram of an inverter with a plurality of DC/DC converters designed as step-up converters;

FIG. 2 a simplified circuit diagram of a step-up converter as a DC/DC converter of an inverter;

FIG. 3 the resulting voltage stroke v of a step-up converter according to the method according to the invention, wherein a voltage ripple $\Delta U_{ZK}$ is superimposed on the intermediate circuit voltage $U_{ZK}$;

FIG. 4 the resulting voltage stroke v of a step-up converter according to the prior art for three different values of the voltage ripple $\Delta U_{ZK}$ of the intermediate circuit voltage $U_{ZK}$;

FIG. 5 the resulting voltage stroke v of a step-up converter according to the method according to the invention for three different values of the voltage ripple $\Delta U_{ZK}$ of the intermediate circuit voltage $U_{ZK}$;

FIG. 6 a schematic diagram of the minimum duty cycle $D_{min}$ of a step-up converter as a function of the input current $I_{DC}$ in the prior art; and FIG. 7 a schematic diagram showing the minimum duty cycle $D_{min}$ of a step-up converter as a function of the input current $I_{DC}$ in the method according to the invention.

FIG. 1 shows a block circuit diagram of an inverter 1 having a plurality of DC/DC converters designed as step-up converters 2. The inverter 1 contains at least one DC input 3 for connecting to at least one DC source 4. A DC/DC converter, which is often designed as a booster or step-up converter 2 or a buck converter, is arranged at each DC input 3. The step-up converter 2 converts the input voltage $U_{IN}$ of the respective DC source 4 applied to the DC input 3 into an output voltage $U_{OUT}$ that is higher by a voltage stroke $V=U_{OUT}/U_{IN}$. A intermediate circuit 5 with an intermediate circuit capacitor $C_{ZK}$ is supplied by the output voltages $U_{OUT}$ of all of the step-up converters 2. The intermediate circuit 5 is followed by a DC/AC converter 6 for converting the intermediate circuit voltage $U_{ZK}$ into a desired AC voltage $U_{AC}$. The AC output 8 is connected to a supply network 9 and/or consumers 10. The various components of the inverter 1 are controlled or regulated via a control device 11.

The inverter 1 is, for example, a photovoltaic inverter of a photovoltaic system for converting the DC voltage $U_{DC}$ generated by photovoltaic modules 13 as DC sources 4 into a corresponding AC voltage $U_{AC}$, which is fed into a supply network 9 or used to supply electrical energy to consumers 10. The DC source 4 can be formed, for example, by wind turbines 14, batteries 15, or other sources.

At least one energy storage unit 12 can also be connected to the intermediate circuit 5 of the inverter 1, which can be used for the temporary storage of electrical energy. Inverters 1 of this type are referred to as hybrid inverters. Energy storage units 12 are usually connected to the inverter 1 via a battery isolator (not shown) and connected as required.

Usually, the step-up converters 2 operate with a fixed voltage stroke v. In accordance with the input voltage $U_{IN}$ and the respective voltage stroke v, an appropriate output voltage $U_{OUT}$ results, which is within the specified limits of the intermediate circuit voltage $U_{ZK}$, hence it must be between the maximum intermediate circuit voltage $U_{ZK\_max}$ and the minimum intermediate circuit voltage $U_{ZK\_min}$. The power output at the AC output 8 of the inverter 1 causes fluctuations in the intermediate circuit voltage $U_{ZK}$ in the form of a superimposed voltage ripple $\Delta U_{ZK}$. This further restricts the operating range of the respective step-up converter 2 with a fixed voltage stroke v in addition to the permissible range for the intermediate circuit voltage $U_{ZK}$ between the maximum intermediate circuit voltage $U_{ZK\_max}$ and the minimum intermediate circuit voltage $U_{ZK\_min}$. According to the invention, it is therefore provided that the voltage stroke v is calculated continuously or dynamically, taking into account the input voltage $U_{IN}$ of the respective step-up converter 2 and the intermediate circuit voltage $U_{ZK}$ including the voltage ripple $\Delta U_{ZK}$, and adjusted accordingly. This means that the voltage stroke v can be kept as small as possible in each case (minimum voltage stroke) and thus a correspondingly small or minimized value of the setpoint of the intermediate circuit voltage $U_{ZK\_soll}$ can be achieved. This results in better utilization of the step-up converter 2, which means that the step-up converter 2 can be operated in a larger operating range. As a result, the efficiency of the inverter 1 can be optimized accordingly.

FIG. 2 shows a simplified circuit diagram of a step-up converter 2 as a DC/DC converter of an inverter 1. The step-up converter 2 has at least one choke 17, a switch 18, a diode 19, and an output capacitor 20. The switch 18 is formed by a semiconductor switch and has a certain parasitic capacitance 21. An input capacitor 16 is also shown in the equivalent circuit diagram of the step-up converter 2. Using the control device 11, the switch 18 is switched on and off with a specified switching frequency $f_S$ and a specified duty cycle D, resulting in a desired output voltage $U_{OUT}$. The output voltage $U_{OUT}$ is greater than the input voltage $U_{IN}$ by the voltage stroke v. The output voltage $U_{OUT}$, which corresponds to the setpoint of the intermediate circuit voltage $U_{ZK\_soll}$, must be located within certain limits between a maximum intermediate circuit voltage $U_{ZK\_max}$ and a minimum intermediate circuit voltage $U_{ZK\_min}$. If one of the two limits is reached, the respective step-up converter 2 is deactivated and the DC source 4 connected to the DC input 3 of the deactivated step-up converter 2, for example a photovoltaic module, may not then be able to contribute to the supply of energy into the supply network 9 or to the supply of electrical energy to the consumers 10. Usually, a plurality of step-up converters 2 are wired in parallel and connected to the same intermediate circuit 5. However, only one step-up converter 2 can be provided for converting the input voltage $U_{IN}$ of a DC source 4.

According to the invention, a voltage measuring device 22 for measuring the input voltage $U_{IN}$ of each step-up converter 2 and a voltage measuring device 23 for measuring the intermediate circuit voltage $U_{ZK}$ including the voltage ripple $\Delta U_{ZK}$ are provided and connected to the control device 11. In the control device 11, the measured values are processed and a dynamic calculation of a minimum voltage stroke v is performed for each step-up converter 2 as a function of the measured input voltage $U_{IN}$ and of the measured voltage ripple $\Delta U_{ZK}$ to minimize the setpoint of the intermediate circuit voltage $U_{ZK\_soll}$. This can result in an optimum usage of the operating range of the respective step-up converter 2, even with fluctuating input voltages $U_{IN}$. The minimum voltage stroke v of each step-up converter 2 is advantageously calculated according to the equation $v=1/(1-D_{min})+\Delta U_{ZK}/2 \cdot U_{IN}$, where v denotes the voltage stroke, $D_{min}$ the minimum duty cycle of the step-up converter 2, $\Delta U_{ZK}$ the voltage ripple, and $U_{IN}$ the input voltage of the step-up converter 2.

In addition, a current measuring device 24 can be provided for measuring the input current $I_{DC}$ of the step-up converter 2 and the control device 11 can be designed to vary the minimum duty cycle $D_{min}$ of the switch 18 of each step-up converter 2 as a function of the measured input current $I_{DC}$. This means that the lower limit for the duty cycle of the switch 18 can be increased slightly at lower input currents $I_{DC}$, and also in this case, operation of the step-up converter 2 with a slightly higher voltage stroke v can be ensured (see description of FIGS. 6 and 7).

FIG. 3 shows the resulting voltage stroke v of a step-up converter 2 according to the method according to the invention, wherein a voltage ripple $\Delta U_{ZK}$ is superimposed on the intermediate circuit voltage $U_{ZK}$. The figure shows the temporal curve of the essentially constant input voltage $U_{IN}$ and the intermediate circuit voltage $U_{ZK}$ with the superimposed voltage ripple $\Delta U_{ZK}$, with the limits of the permissible range of the intermediate circuit voltage $U_{ZK}$ in the form of the maximum intermediate circuit voltage $U_{ZK\_max}$ and the minimum intermediate circuit voltage $U_{ZK\_min}$ being drawn as dotted lines. The minimum voltage stroke v is calculated at the measured input voltage $U_{IN}$ of the step-up converter 2 and the measured voltage ripple $\Delta U_{ZK}$ such that the input voltage $U_{IN}$ multiplied by the voltage stroke v results in the mean value $U_{ZK\_mean}$ of the intermediate circuit voltage $U_{ZK}$, which also corresponds to the control setpoint $U_{ZK\_soll}$ of the intermediate circuit voltage $U_{ZK}$. The voltage ripple $\Delta U_{ZK}$ is superimposed on the mean value $U_{ZK\_mean}$ of the intermediate circuit voltage $U_{ZK}$. The output voltage $U_{OUT}$ of the step-up converter 2 and the mean value $U_{ZK\_mean}$ of the intermediate circuit voltage $U_{ZK}$ have the same value.

FIG. 4 shows the resulting voltage stroke v of a step-up converter according to the prior art for three different values of the voltage ripple $\Delta U_{ZK}$ of the intermediate circuit voltage $U_{ZK}$. The limits of the permissible range of the intermediate circuit voltage $U_{ZK}$ in the form of the maximum intermediate circuit voltage $U_{ZK\_max}$ and the minimum intermediate circuit voltage $U_{ZK\_min}$ (see FIG. 3) are not shown here for the sake of clarity. The left-hand part of the temporal curve of the voltages shows the case in which no voltage ripple $\Delta U_{ZK}$ is superimposed on the intermediate circuit voltage $U_{ZK}$. This is the case, for example, when an energy storage unit 12 of the inverter 1 is being charged by the photovoltaic modules 13 as the DC source 4. In the middle part of the figure, a small voltage ripple $\Delta U_{ZK}$ is superimposed on the intermediate circuit voltage $U_{ZK}$. This is the case, for example, when a fairly small current flows from the inverter 1 into the supply network 9 or the consumers 10, i.e. at a fairly low power consumption. In the right-hand part of the figure, a large voltage ripple $\Delta U_{ZK}$ is superimposed on the intermediate circuit voltage $U_{ZK}$. This situation occurs, for example, with a higher current flow from the inverter 1 into the supply network 9 or the consumers 10, i.e. at a higher power consumption. According to the prior art, the voltage stroke v of the respective step-up converter 2 would be selected so that the size of the setpoint $U_{ZK\_soll}$ of the intermediate circuit voltage is such that for all three cases, i.e. for all three values of the voltage ripple $\Delta U_{ZK}$, that it lies within the permissible range of the intermediate circuit voltage $U_{ZK}$, i.e. between the minimum intermediate circuit voltage $U_{ZK\_min}$ and the maximum intermediate circuit voltage $U_{ZK\_max}$. The voltage stroke v according to the prior art would be designed for a worst-case operation and would be accepted for the voltage stroke $v_1$, $v_2$ and $v_3$ in all three cases and would therefore be of the same size.

FIG. 5 shows the resulting voltage stroke v of a step-up converter according to the method according to the invention for the three different values of the voltage ripple $\Delta U_{ZK}$ of the intermediate circuit voltage $U_{ZK}$ according to FIG. 4. Here also, the limits of the permissible range of the intermediate circuit voltage $U_{ZK}$ in the form of the maximum intermediate circuit voltage $U_{ZK\_max}$ and the minimum intermediate circuit voltage $U_{ZK\_min}$ (see FIG. 3) are not shown here for the sake of clarity. Here, by taking into account the voltage ripple $\Delta U_{ZK}$, an optimal calculation of a minimum voltage stroke v can take place. In the left-hand part of the figure, the case in which the intermediate circuit voltage $U_{ZK}$ has no superimposed voltage ripple $\Delta U_{ZK}$, the result would lead to a minimum voltage stroke v, which could be increased if necessary by a specified voltage stroke $\Delta v$ to take a controller reserve into account. Nevertheless, the minimum voltage stroke $v_1$ in this case is significantly lower than that according to the prior art (see FIG. 4, left-hand part of the figure). In the middle part of the voltage characteristic also, in which a small voltage ripple $\Delta U_{ZK}$ is superimposed on the intermediate circuit voltage $U_{ZK}$, the method according to the invention results in a lower value for the voltage stroke $v_2$ than in the prior art by taking into account the voltage ripple $\Delta U_{ZK}$ (see FIG. 4, middle part of the figure). Only in the right-hand part of the voltage characteristic, where a large voltage ripple $\Delta U_{ZK}$ is superimposed on the intermediate circuit voltage $U_{ZK}$, does the method according to the invention result in a voltage stroke $v_3$ which corresponds to that of the prior art (see FIG. 4, right-hand part of the figure).

The comparison of FIGS. 4 and 5 clearly shows the effect of the consideration of the voltage ripple $\Delta U_{ZK}$ on the determination of the minimum voltage stroke v of the step-up converter 2. While in the prior art according to FIG. 4, all three cases of different voltage ripples $\Delta U_{ZK}$ result in an equal voltage stroke v and thus an equal output voltage $U_{OUT}$ of the step-up converter 2, in the method according to the invention the voltage stroke v can be reduced at lower values of the voltage ripple $\Delta U_{ZK}$, as a result of which the respective output voltage $U_{OUT}$ of the step-up converter as the setpoint $U_{ZK\_soll}$ of the intermediate circuit voltage $U_{ZK}$ can also be reduced.

FIG. 6 shows a schematic diagram of the minimum duty cycle $D_{min}$ as a function of the input current $I_{DC}$ of a step-up converter 2. In the prior art, a minimum duty cycle $D_{min}$ of the switch 18 of the step-up converter 2 is defined independently of the input current $I_{DC}$ and the region (shaded region) above this limit is used for regulating the step-up converter 2. The minimum duty cycle $D_{min}$ depends on the parasitic capacitance 21 of the switch 18. Above a certain minimum input current $I_{DC\_min}$, the step-up converter 2 can no longer be controlled with the minimum duty cycle $D_{min}$, which is why operation of the step-up converter 2 is not possible below this minimum input current $I_{DC\_min}$.

FIG. 7 shows a schematic diagram of the minimum duty cycle $D_{min}$ as a function of the input current $I_{DC}$ of a step-up converter 2 with the method according to the invention. Depending on the size of the input current $I_{DC}$ of the step-up converter 2, the minimum switching time of the switch 18 is changed due to its parasitic capacitance 21. At a lower input current $I_{DC}$, the minimum duty cycle $D_{min}$ of the step-up converter 2 must be increased, whereas at a higher input current $I_{DC}$, the minimum duty cycle $D_{min}$ must be reduced. This means that in certain cases, for example in the morning hours with a photovoltaic module as the DC source 4 at a lower input current $I_{DC}$, the voltage stroke v of the step-up converter 2 can be optimally adjusted by adjusting the minimum duty cycle $D_{min}$, and at lower input currents $I_{DC}$ the step-up converter 2 can be operated and controlled with an increased minimum duty cycle $D_{min}$. Accordingly, the operating range (shaded region) of the step-up converter 2 can be increased.

The invention claimed is:

1. A method for operating an inverter (1) for converting a DC voltage ($U_{DC}$) into an AC voltage ($U_{AC}$), wherein with at least one DC/DC converter formed by a step-up converter (2) an input voltage ($U_{IN}$) of a DC source (4) applied at the DC input (3) of the step-up converter (2) is converted into an output voltage ($U_{OUT}$) that is higher by a voltage stroke ($v=U_{OUT}/U_{IN}$), with the output voltages ($U_{OUT}$) of all the step-up converters (2) an intermediate circuit (5) that has an intermediate circuit capacitor ($C_{ZK}$) is supplied with an intermediate circuit voltage ($U_{ZK}$), the intermediate circuit voltage ($U_{ZK}$) is converted by means of a DC/AC converter (6) into the AC voltage ($U_{AC}$) and applied to an AC output (8) connected to a supply network (9) and/or consumers (10), as a result of which a voltage ripple ($\Delta U_{ZK}$) is superimposed on the intermediate circuit voltage ($U_{ZK}$) at the intermediate circuit capacitor ($C_{ZK}$), wherein in each step-up converter (2) with at least one choke (17), a switch (18), a diode (19), and an output capacitor (20) the switch (18) is switched on and off with a specific switching frequency ($f_s$) and a specific duty cycle (D) via a control device (11), so that the output voltage ($U_{out}$) of each step-up converter (2) corresponds to a setpoint value of the intermediate circuit voltage ($U_{ZK\_soll}$) between a maximum intermediate circuit voltage ($U_{ZK\_max}$) and a minimum DC link voltage ($U_{ZK\_min}$), and wherein the input voltage ($U_{IN}$) of each step-up converter (2) and the intermediate circuit voltage ($U_{ZK}$) including the voltage ripple ($\Delta U_{ZK}$) are measured,
wherein
the voltage stroke (v) of each step-up converter (2) is dynamically calculated and minimized as a function of the measured input voltage ($U_{IN}$) of the respective step-up converter (2) and of the measured voltage ripple ($\Delta U_{ZK}$) of the intermediate circuit voltage ($U_{ZK}$), and the switch (18) of each step-up converter (2) is switched on and off with the specified switching frequency ($f_s$) and the specified duty cycle (D) so that the input voltage ($U_{IN}$) is converted according to the calculated voltage stroke (v) into a corresponding output voltage ($U_{OUT}$) that corresponds to the setpoint of the intermediate circuit voltage ($U_{ZK\_soll}$) and therefore the setpoint of the intermediate circuit voltage ($U_{ZK\_soll}$) is minimized.

2. The method according to claim 1, wherein the switch (18) of each step-up converter (2) is switched on and off via the control device (11), taking into account a specified minimum duty cycle ($D_{min}$), with the specified frequency ($f_s$) and the specified duty cycle (D).

3. The method according to claim 2, wherein the voltage stroke (v) of each step-up converter (2) is dynamically calculated according to the equation $$v = 1/(1-D_{min}) + \Delta U_{ZK}/2 \cdot U_{IN}.$$

4. The method according to claim 2, wherein the input current ($I_{DC}$) of each step-up converter (2) is measured and the minimum duty cycle ($D_{min}$) of the switch (12) of each step-up converter (2) is changed as a function of the measured input current ($I_{DC}$).

5. The method according to claim 1, wherein the calculated voltage stroke (v) of each step-up converter (2) is increased by a defined value ($\Delta v$).

6. The method according to claim 1, wherein the input voltage ($U_{IN}$) of each step-up converter (2) and the intermediate circuit voltage ($U_{ZK}$) including the voltage ripple ($\Delta U_{ZK}$) and, if applicable, the current ($I_{DC}$) through the choke (17), are measured with a sampling frequency ($f_A$) which corresponds to a multiple of the network frequency ($f_N$) of the AC voltage ($U_{AC}$), and the voltage stroke (v) and, if applicable, the minimum duty cycle ($D_{min}$) are calculated from this.

7. The method according to claim 1, wherein each step-up converter (2) is bi-directional and used as a step-down converter for converting the output voltage ($U_{OUT}$) into a lower input voltage ($U_{IN}$).

8. An inverter (1) for converting a DC voltage ($U_{DC}$) into an AC voltage ($U_{AC}$), having at least one DC/DC converter formed by a step-up converter (2) for converting an input voltage ($U_{IN}$) of a DC source (4) applied at the DC input (3) of the step-up converter (2) into a higher output voltage ($U_{OUT}$) with a voltage stroke (v), an intermediate circuit (5) that has an intermediate circuit capacitor ($C_{ZK}$) and is supplied with the output voltages ($U_{OUT}$) of all the step-up converters (2), a DC/AC converter (6) and an AC output (8) for connection to a supply network (9) and/or consumers (10), as a result of which a voltage ripple ($\Delta U_{ZK}$) can be superimposed on the intermediate circuit voltage ($U_{ZK}$) at the intermediate circuit capacitor ($C_{ZK}$), wherein each step-up converter (2) has at least one choke (17), a switch (18), a diode (19), and an output capacitor (20), and having a control device (11) that is designed to switch the switch (18) of each step-up converter (2) on and off with a specific switching frequency ($f_s$) and a specific duty cycle (D) so that the output voltage ($U_{OUT}$) of each step-up converter (2) corresponds to a setpoint value of the intermediate circuit voltage ($U_{ZK\_soll}$) between a maximum intermediate circuit voltage ($U_{ZK\_max}$) and a minimum intermediate circuit voltage ($U_{ZK\_min}$), wherein a voltage measuring device (22) for measuring the input voltage ($U_{IN}$) of each step-up converter (2) and a voltage measuring device (23) for measuring the intermediate circuit voltage ($U_{ZK}$) including the voltage ripple ($\Delta U_{ZK}$) are provided,
wherein
the control device (11) is designed to dynamically calculate and minimize the minimum voltage stroke (v) of each step-up converter (2) as a function of the measured input voltage ($U_{IN}$) of the respective step-up converter (2) and of the measured voltage ripple ($\Delta U_{ZK}$) of the intermediate circuit voltage ($U_{ZK}$) and to switch the switch (18) of each step-up converter (2) on and off with the specified switching frequency ($f_s$) and the specified duty cycle (D), so that the input voltage ($U_{IN}$) can be converted according to the calculated voltage stroke (v) into a corresponding output voltage ($U_{OUT}$) that corresponds to the setpoint of the intermediate circuit voltage ($U_{ZK\_soll}$), as a result of which the setpoint of the intermediate circuit voltage ($U_{ZK\_soll}$) can be minimized.

9. The inverter (1) according to claim 8, wherein the control device (11) is designed to switch the switch (18) of each step-up converter (2) on and off with the specified switching frequency ($f_s$) and the specified duty cycle (D), taking into account a specified minimum duty cycle ($D_{min}$).

10. The inverter (1) according to claim 9,
wherein the control device (11) is designed to dynamically calculate the voltage stroke (v) of each step-up converter (2) according to the equation $$v=1/(1-D_{min})+\Delta U_{ZK}/2 \cdot U_{IN}.$$

11. The inverter (1) according to claim 9, wherein a current measuring device (24) is provided for measuring the input current ($I_{DC}$) of each step-up converter (2) and that the control device (11) is designed to vary the minimum duty cycle ($D_{min}$) of the switch (18) of each step-up converter (2) as a function of the measured input current ($I_{DC}$).

12. The inverter (1) according to claim 8, wherein the control device (11) is designed to increase the calculated voltage stroke (v) of each step-up converter (2) by a defined value ($\Delta v$).

13. The inverter (1) according to claim 8, wherein the voltage measuring device (22) is designed to measure the input voltage ($U_{IN}$) of each step-up converter (2), the voltage measuring device (23) is designed to measure the intermediate circuit voltage ($U_{ZK}$) including the voltage ripple ($\Delta U_{ZK}$) and, if applicable, the current measuring device (24) is designed to measure the input current ($I_{DC}$) of each step-up converter (2) for recording measured values with a sampling frequency ($f_A$) which corresponds to a multiple of the network frequency ($f_N$) of the AC voltage ($U_{AC}$), and from this to calculate the voltage stroke (v) and, if applicable, the minimum duty cycle ($D_{min}$).

14. The inverter (1) according to claim 8, wherein the DC source (4) is formed by a photovoltaic module (13), a wind turbine (14), and/or a battery (15).

15. The inverter (1) according to claim 8, wherein each step-up converter (2) is bi-directional.

* * * * *